United States Patent [19]

Arpin et al.

[11] Patent Number: 5,759,687

[45] Date of Patent: Jun. 2, 1998

[54] SIZED GLASS THREADS FOR REINFORCING ORGANIC MATERIALS

[75] Inventors: Michel Arpin, Servolex; Jean-Philippe Gasca, St Jean de la Porte, both of France

[73] Assignee: Vetrotex France, Chambery, France

[21] Appl. No.: 589,000

[22] Filed: Jan. 19, 1996

[30] Foreign Application Priority Data

Jan. 19, 1995 [FR] France ............... 95 00570

[51] Int. Cl.$^6$ ............... D02G 3/00; C08G 5/32; C08F 283/06

[52] U.S. Cl. ............... 428/370; 428/375; 428/391; 428/392; 525/403; 525/404

[58] Field of Search ............... 428/375, 391, 428/392, 370; 525/454, 403, 404, 405

[56] References Cited

U.S. PATENT DOCUMENTS

| | | | |
|---|---|---|---|
| 4,131,632 | 12/1978 | Suzuki et al. | 525/496 |
| 4,410,645 | 10/1983 | Balbhadra Das et al. | |
| 4,615,946 | 10/1986 | Temple . | |
| 4,637,956 | 1/1987 | Das et al. | 428/391 |
| 4,933,381 | 6/1990 | Hager | 523/414 |
| 5,262,236 | 11/1993 | Brannon | 428/391 |
| 5,290,883 | 3/1994 | Hosokawa et al. | 525/423 |
| 5,308,893 | 5/1994 | Hagenson et al. | 523/436 |
| 5,395,697 | 3/1995 | Morrison | 428/412 |
| 5,430,079 | 7/1995 | Efner et al. | 523/436 |
| 5,514,736 | 5/1996 | Boudreaux | 525/436 |
| 5,536,775 | 7/1996 | Curatolo et al. | 525/418 |
| 5,549,949 | 8/1996 | Williams et al. | 428/36.9 |
| 5,605,757 | 2/1997 | Klett | 428/391 |

FOREIGN PATENT DOCUMENTS

WO 91/09082  6/1991  WIPO .

OTHER PUBLICATIONS

Patent Abstract No. JP–A–59 021 542. Feb. 3, 1984.

*Primary Examiner*—Newton Edwards
*Attorney, Agent, or Firm*—Oblon, Spivak, McClelland, Maier & Neustadt, P.C.

[57] ABSTRACT

The invention relates to glass threads coated with a sizing composition comprising (A) at least one alkane polyglycidyl ether, (B) at least one coupling agent and (C) at least one adhesive film-forming agent. These threads are especially suitable for reinforcing thermoplastic polyesters, such as polybutylene terephthalate or polyethylene terephthalate.

18 Claims, No Drawings

SIZED GLASS THREADS FOR REINFORCING ORGANIC MATERIALS

BACKGROUND OF THE INVENTION

1. Field of the Invention

The present invention relates to sized glass threads for reinforcing thermoplastic organic materials, such as thermoplastic polyesters and, more particularly, terephthalic acid polyesters and copolyesters. The present invention relates also to the reinforced products, or "composites", obtained using the above mentioned sized threads.

2. Description of the Prior Art

Thermoplastic materials have been used industrially for several years to produce molded articles. However, many of these materials, when used alone, do not yield molded bodies having adequate mechanical properties. For example, various thermoplastic polyesters, such as polyethylene terephthalate (or "PET"), polybutylene terephthalate (or "PBT") or polycyclohexane dimethanol terephthalate (or "PCT"), when molded at substantial thicknesses, give relatively fragile molded bodies.

Such materials are therefore generally provided with reinforcements before molding in order to obtain composites having improved mechanical properties. Glass threads, or "fibers", are preferred reinforcements for such materials. These threads are generally coated in the course of manufacture with sizing compositions which ensure that the filaments of which they are composed are connected to one another and which enable them to be protected against abrasion. These compositions also contribute to the formation of a bond between the glass and the material which the threads are intended to reinforce.

The glass threads currently used for reinforcing thermoplastic polyesters are thus coated with conventional sizing compositions which are based, for example, on coupling agents, such as silanes; and adhesive film-forming agents, such as polyurethanes or epoxy polymers. Examples of glass threads used to reinforce PBT are given especially in U.S. Pat. Nos. 4,271,229 and 4,615,946. The mechanical properties of the composites obtained using conventional sized glass threads and the above-mentioned thermoplastic polymer:, are better than those of polyesters which are not reinforced by glass threads, but it is advantageous in the case of certain applications to obtain a greater improvement in mechanical properties, especially a substantial improvement in impact strength properties.

The object of the present invention is therefore to obtain composites based on glass threads and thermoplastic materials, such as thermoplastic polyesters and, more particularly, terephthalic acid polyesters and copolyesters, and having mechanical properties, especially impact strength properties, which are improved compared to the properties of composites generally obtained from the same materials and conventional glass threads.

SUMMARY OF THE INVENTION

This object is achieved by means of glass threads coated with a sizing composition comprising (A) at least one alkane polyglycidyl ether, (B) at least one coupling agent and (C) at least one adhesive film-forming agent.

The present invention relates also to composites obtained from sized threads according to the invention, these composites comprising at least one organic material, such as a thermoplastic polyester, and sized glass threads, wherein at least some of the threads are sized glass threads according to the invention.

DESCRIPTION OF THE PREFERRED EMBODIMENTS

The sized threads according to the invention are prepared in accordance with processes known per se. One such process comprises drawing thin streams of molten glass in the form of one or more fans of continuous filaments from the openings of one or more dies, and coating the filaments with the sizing composition of the present invention before gathering the filaments into one or more threads. The threads may then be wound onto rotating supports before undergoing other operations, such as extraction with a view to indirect cutting, weaving, and the like, may be distributed on moving conveyors or may be cut after formation by a member used to draw them, such as direct cutting under the die. Thus, depending on the mechanical characteristics desired for the reinforced products and depending on the methods of implementation used, the presentation of the sized glass threads varies. The glass threads according to the invention may, particularly, be in the form of rolls of continuous threads, such as rovings, cakes, cops, and the like, cut threads, mats, such as sheets of intermingled continuous threads, braids, ribbons, meshes, and other forms. These various threads are generally composed of filaments having a diameter of between 5 and 24 µm.

The sizing composition coating the threads according to the invention is preferably an aqueous composition which is easy to handle and which comprises, for example, between 90 and 99% by weight of water. In the majority of cases, it is in the form of an aqueous dispersion, such as an emulsion, suspension, mixture of emulsion(s) and/or suspension(s), and, preferably, in the form of an aqueous emulsion or an aqueous mixture of emulsions. The threads coated with the composition are generally dried before being used to reinforce organic materials, because the water included in the sizing composition may be detrimental to the good adhesion between the glass and the organic material.

In this connection, it is understood that "glass threads coated with a sizing composition comprising . . . " as used to describe the present invention includes not only threads coated with the composition which are obtained at the outlet of the device(s) for depositing the size (the components of the sizing composition may optionally be deposited separately or in several stages), but also these same threads after drying and/or after other treatments designed, for example, to eliminate certain components of the sizing composition, especially the water included in the composition when the composition is in the form of an aqueous dispersion, and/or at polymerizing certain components of the said composition.

Preferably, in the case where the sizing composition according to the invention is in the form of an aqueous dispersion, the "solids content" of the composition is between 1 and 15% by weight, and more preferably, between 2 and 10% by weight.

The "alkane-polyglycidyl ether" according to the invention is in the form of a branched or unbranched, cyclic or non-cyclic hydrocarbon chain to which at least two glycidyl ether groups are attached. Preferably, the alkane polyglycidyl ether is an alkane di- or tri-glycidyl ether, i.e., a compound corresponding to the following formula:

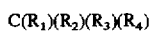

wherein:

$R_1$ is selected from the following groups:

—X, —R'$_1$X $R_2$ is selected from the following groups:
—X, —R'$_2$X $R_3$ is selected from the following groups:
—H, —R'$_3$, —R'$_3$X, —X $R_4$ is selected from the following groups:
—H, —R'$_4$ in which:

X is a glycidyl ether group of the formula:

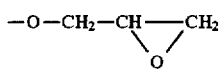

R'$_1$, R'$_2$, R'$_3$ and R'$_4$, which may be the same or different, are hydrocarbon groups having a number of carbon atom(s) of preferably less than 4.

According to a preferred embodiment, the alkane polyglycidyl ether is a trimethylol propane triglycidyl ether (marketed especially under the reference "Heloxy 48" by SHELL) corresponding to the above formula wherein:

$R_1=R_2=R_3=$—CH$_2$—X $R_4=$—CH$_2$—CH$_3$

According to another embodiment of the invention, the alkane polyglycidyl ether is a trimethylol ethane triglycidyl ether (marketed especially under the reference "Heloxy 44" by SHELL) corresponding to the above formula wherein:

$R_1=R_2=R_3=$—CH$_2$—X $R_4=$—CH$_3$

The sizing composition used to coat the threads according to the invention comprises at least one alkane polyglycidyl ether and may comprise a mixture of alkane polyglycidyl ethers, for example, a mixture of trimethylol propane triglycidyl ether and trimethylol ethane triglycidyl ether.

Without wishing to be bound by any particular theory, it is believed that the alkane polyglycidyl ether of the sizing composition according to the invention acts as a crosslinking agent with respect to the organic material to be reinforced and/or acts as a coupling co-agent reinforcing the adhesion between the glass threads and the material to be reinforced during the production of composites from the said threads and the said materials;, and therefore enables the mechanical properties of the composites obtained to be improved. This compound also has the advantage of not being toxic and therefore meets a constant safety concern generally felt in the industry and especially in the field of sizing compositions.

The amount of alkane polyglycidyl ether(s) in the sizing composition according to the invention is generally between 0.1 and 6% and preferably between 0.2 and 5% by weight of the composition, when the composition is in the form of an aqueous dispersion.

In addition to the alkane polyglycidyl ether(s) mentioned above, the composition coating the glass threads according to the invention comprises at least one coupling agent. The coupling agent assists the coupling between the glass threads and the reinforced organic material and may be selected from coupling agents well known in the art, such as silanes, titanates, and the like. The coupling agent according to the invention is preferably a water-soluble organosilane, and notably, an aminosilane or an epoxysilane. By way of non-limiting examples, the coupling agent may be a gammaaminopropyltriethoxysilane (marketed especially under the reference "A 1100" by UNION CARBIDE), an N-beta (aminoethyl) gammaaminopropyltrimethoxysilane (marketed especially under the reference "A 1120" by UNION CARBIDE), a gammamethacryloxypropyltrimethoxysilane, a gammaglycidyloxypropyltrimethoxysilane, and the like. The sizing composition may also comprise a mixture of coupling agents, especially a mixture of two or more of the above-mentioned organosilanes.

Preferably, the amount of organosilanes in the sizing composition according to the invention is between 0.1 and 2% by weight of the composition when the composition is in the form of an aqueous dispersion.

The sizing composition according to the invention also comprises at least one adhesive film-forming agent. This agent acts, particularly, on the integrity and on the protection of the sized glass threads; it also enables the active compounds of the composition, especially the alkane polyglycidyl ether(s), to be maintained at the surface of the threads. When the composition according to the invention is in the form of an aqueous dispersion, the film-forming adhesive agent must be capable of being brought into emulsion, suspension or solution in water. It may be, particularly, an epoxy polymer, a polyurethane, an epoxy/polyurethane copolymer, a polyisocyanate containing blocked isocyanates, and the like. The sizing composition may also comprise a mixture of film-forming adhesive agents. The amount of film-forming adhesive agent(s) is preferably between 0.2 and 8%, and more preferably between 1 and 6%, by weight of the composition when the composition is in the form of an aqueous dispersion.

The ratio of the amount of alkane polyglycidyl ether(s) to the amount of film-forming adhesive agent(s) in the composition is preferably between 0.1 and 1.

In one embodiment of the invention, the sizing composition coating the threads according to the invention may also comprise at least one lubricating agent in amounts of between 0 and 2% by weight of the composition. This lubricating agent may be any type of lubricating agent customarily used by a person skilled in the art in sizing compositions for glass threads, such as a polyethylene glycol, an ethoxylated fatty acid polyester, and the like. This agent may especially be present in the sizing composition according to the invention when the glass threads according to the invention are produced in the form of rovings.

The sizing composition according to the invention may also, depending on the embodiments of the invention, comprise any type of additive customarily used in this type of composition and especially a surfactant and/or a wetting agent and/or an anti-static agent, etc.

The composition according to the invention may be obtained by mixing all the components simultaneously or by adding the components in several stages. Generally, the active compounds, especially (A), (B) and (C) according to the invention, are added in a "prediluted" form, i.e., in solution or in emulsion in a solvent such as water. The organosilane coupling agent is thus generally added to the composition in a hydrolysed form, and the alkane polyglycidyl ether and the adhesive film-forming agent are generally added in the form of emulsions. After the active compounds have been mixed, a solvent, preferably water, may be added to the mixture in order to obtain the composition and the proportions desired.

Optionally, an organic acid, such as acetic acid, or a base, such as ammonium hydroxide, may be added to the sizing composition according to the invention, for example, before the incorporation of organosilane coupling agent(s), in order to adjust the pH of the composition for the purpose of obtaining a stable composition.

The loss on ignition of the sized threads according to the invention is preferably between 0.1 and 2% by weight and, in the case of cut threads, preferably between 0.1 and 1% by weight. These threads permit the efficient reinforcement of thermoplastic organic materials, such as thermoplastic polyesters, as will be illustrated hereinafter.

The reinforced materials preferably comprise at least one polybutylene terephthalate (PBT) and/or at least one polyethylene terephthalate (PET) and/or at least one copolymer of butylene terephthalate and ethylene terephthalate, and these polymers and/or copolymers may be in amorphous, crystalline or semi-crystalline form. The above-mentioned PBT, PET and copolymers may be obtained in accordance with methods known by a person skilled in the art, especially by the alcoholization of terephthalic acid esters with ethylene glycol or butanediol, then polymerization, by heating the glycols with the acids or the halogenated derivatives of the acids or, in the case of copolymers, from copolymers of aromatic vinyl compounds and modified copolymers.

The composites according to the invention thus comprise at least one thermoplastic organic material and sized glass threads, wherein at least some of the threads are sized glass threads according to the invention.

These composites are produced in accordance with methods well known to a person skilled in the art, such as injection-molding, extrusion, and the like. The content of glass threads in the composites produced is preferably between 5 and 60% by weight of the composites.

Having generally described this invention, a further understanding can be obtained by reference to certain specific examples which are provided herein for purposes of illustration only and are not intended to be limiting unless otherwise specified.

The following Examples illustrate the sizing compositions and the sized glass threads according to the present invention and permit a comparison of the mechanical properties obtained for composites produced from glass threads according to the invention to the mechanical properties obtained for composites produced from conventional glass threads.

REFERENCE EXAMPLE

Glass filaments 10 μm in diameter obtained by drawing thin streams of molten glass from a die are coated with a sizing composition comprising 0.4% by weight of a gammaaminopropyltriethoxysilane coupling agent (marketed under the reference "Silane A 1100" by UNION CARBIDE); 4.6% by weight of an adhesive film-forming agent in the form of an epoxy polymer (corresponding to 11.5% by weight of an emulsion marketed under the reference "Nézoxyl 962" by DSM); 0.5% by weight of ethoxylated nonyl phenol having 30 moles of ethylene oxide and 94.5% by weight of water, i.e., a solids content of 5.5% by weight.

The filaments coated with size are then gathered into threads which are wound to give rolls. The threads are then removed from the rolls and cut to a length of 4.5 mm by a member which is used to draw them mechanically. The loss on ignition of the threads obtained is 0.65% by weight.

Composites are then produced using a Clextral BC 45 extruder (marketed by CLEXTRAL) fed with the cut threads obtained and with PBT in the form of granules (marketed under the reference "Ultradur B 4500" by BASF). The amount of glass in the composites obtained is 15% by weight.

Several specimens of the composites obtained are produced and the tensile and flexural breaking stresses and the Charpy and notched Izod impact strengths of these specimens are measured under conditions defined, respectively, by the standards ISO R 527,ISO R 178,ISO R 179 and ISO R 180. The results obtained are indicated in Table 1. The standard deviations are indicated in brackets.

EXAMPLE 1

Glass filaments 10 μm in diameter obtained by drawing thin streams of molten glass from a die are coated with a sizing composition comprising 1.1% by weight of trimethylol propane triglycidyl ether (marketed under the reference "Heloxy 48" by SHELL); 0.4% by weight of a gammaaminopropyltriethoxysilane coupling agent (marketed under the reference "Silane A 1100' by UNION CARBIDE); 0.45% by weight of a gamma-glycidyloxypropyltrimethoxysilane coupling agent (marketed under the reference "Silane A 187" by UNION CARBIDE); 4.3% by weight of an adhesive film-forming agent in the form of an epoxy polymer (corresponding to 7.17% by weight of an emulsion marketed under the reference "Epirez 5520 W 60" by SHELL) and 93.75% by weight of water, i.e., a solids content of 6.25% by weight.

The filaments coated with size are then gathered into threads which are wound and then cut as in the Reference Example. The loss on ignition of the threads obtained is 0.6% by weight.

Composites are then produced from the cut threads obtained, as in the Reference Example. The mechanical properties of the composites comprising the same amount of glass as in the Reference Example are also measured and indicated in Table 1.

EXAMPLE 2

Glass filaments obtained by drawing thin streams of molten glass from a die are coated with a sizing composition comprising 1.1% by weight of trimethylol propane triglycidyl ether ("Heloxy 48"); 0.8% by weight of a gammaaminopropyltriethoxysilane coupling agent ("A 1100"); 4.3% by weight of an adhesive film-forming agent in the form of an epoxy polymer (corresponding to 10.75% by weight of an emulsion marketed under the reference "Néoxyl 962" by DSM) and 93.8% by weight of water, i.e., a solids content of 6.2% by weight. The filaments coated with size are then gathered into threads which are wound and then cut as in the Reference Example. The loss on ignition of the threads obtained is 0.6% by weight.

Composites are then produced from the cut threads obtained, as in the Reference Example. The mechanical properties of the composites comprising the same amount of glass as in the Reference Example are also measured and indicated in Table 1.

It will be observed that the mechanical properties of the composites comprising threads according to the invention, i.e., Examples 1 and 2, are significantly better than the mechanical properties of the composites comprising conventional sized threads, i.e., Reference Example.

The glass threads according to the invention are used principally for reinforcing thermoplastic polyesters such as PBT, PET or glycol/terephthalic or isophthalic acid copolymers.

TABLE 1

|  | Tensile breaking stress (MPa) | Flexural breaking stress (MPa) | Charpy impact strength (KJ/m²) | Notched Izod impact strength (J/m) |
|---|---|---|---|---|
| Reference | 105.4 (0.3) | 167 (1) | 24.2 (2.4) | 61 (2) |
| Example 1 | 117.7 (0.4) | 175 (1) | 30.3 (2.1) | 74 (3) |
| Example 2 | 111.8 (0.2) | 172 (1) | 27.4 (1.7) | 70 (3) |

Obviously, additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Glass threads coated with a sizing composition comprising:
   (A) at least one alkane-polyglycidyl ether,
   (B) at least one coupling agent, and
   (C) at least one adhesive film-forming agent.

2. Glass threads according to claim 1, wherein the alkane polyglycidyl ether corresponds to the following formula:

$$C(R_1)(R_2)(R_3)(R_4)$$

wherein:
$R_1$ is selected from the following groups:
—X, —R'$_1$X
$R_2$ is selected from the following groups:
—X, —R'$_2$X
$R_3$ is selected from the following groups:
—H, —R'$_3$, —R'$_3$X, —X
$R_4$ is selected from the following groups:
—H, —R'$_4$
in which:
X is a glycidyl ether group of the formula:

—O—CH$_2$—CH——CH$_2$
       \\ /
        O

R'$_1$, R'$_2$, R'$_3$ and R'$_4$, which may be the same or different, are hydrocarbon groups.

3. Glass threads according to claim 2, wherein $R_1$, $R_2$, and $R_3$ are —CH$_2$—X, and $R_4$ is —CH$_2$—CH$_3$.

4. Glass threads according to claim 2, wherein $R_1$, $R_2$, and $R_3$ are —CH$_2$—X, and $R_4$ is —CH$_3$.

5. Glass threads according to claim 1, wherein the coupling agent is an organosilane.

6. Glass threads according to claim 5, wherein the organosilane comprises an aminosilane.

7. Glass threads according to claim 5, wherein the organosilane comprises an epoxysilane.

8. Glass threads according to claim 5, wherein the organosilane comprises an aminosilane and an epoxysilane.

9. Glass threads according to claim 1, wherein the adhesive film-forming agent is an epoxy polymer, a polyurethane, an epoxy/polyurethane copolymer or a polyisocyanate containing blocked isocyanates.

10. Glass threads according to claim 1, wherein the sizing composition also comprises (D) at least one lubricating agent.

11. Glass threads according to claim 1, wherein the sizing composition also comprises (E) at least one additive selected from the group consisting of surfactants, wetting agents and anti-static agents.

12. Glass threads according to claim 1, wherein the sizing composition is in the form of an aqueous dispersion comprising said (A), (B) and (C).

13. Glass threads according to claim 12, wherein the amount of alkane polyglycidyl ether(s) is between 0.1 and 6% by weight of the composition.

14. Glass threads according to claim 12, wherein the amount of adhesive film-forming agent(s) is between 0.2 and 8% by weight of the composition.

15. Glass threads according to claim 12, wherein the composition has a solids content of between 1 and 15% by weight of the composition.

16. Glass threads according to claim 1, wherein loss on ignition of said glass threads is between 0.1 and 2% by weight of said glass threads.

17. A composite comprising at least one thermoplastic polyester and sized glass threads, wherein at least some of the threads are glass threads according to claim 1.

18. The composite according to claim 17, wherein the thermoplastic polyester comprises at least one member selected from the group consisting of polybutylene terephthalates, polyethylene terephthalates, butylene terephthalate/ethylene terephthalate copolymers, and mixtures thereof.

* * * * *